United States Patent [19]

Suzumori

[11] Patent Number: 5,385,080

[45] Date of Patent: Jan. 31, 1995

[54] ACTUATOR WITH FLEXIBLE CYLINDERS

[75] Inventor: Kohichi Suzumori, Kanawaga, Japan

[73] Assignee: Kabushiki Kaisha Toshiba, Kawasaki, Japan

[21] Appl. No.: 142,122

[22] Filed: Oct. 28, 1993

Related U.S. Application Data

[63] Continuation of Ser. No. 945,267, Sep. 15, 1992, abandoned, which is a continuation of Ser. No. 631,812, Dec. 20, 1990, Pat. No. 5,156,081.

[30] Foreign Application Priority Data

Dec. 20, 1989 [JP] Japan .................. 1-328435

[51] Int. Cl.$^6$ .................. F01B 19/04; F15B 11/20
[52] U.S. Cl. .................. 92/171.1; 91/525
[58] Field of Search .................. 92/48, 61, 64, 89, 90, 92/92, 128, 171.1; 91/521, 525

[56] References Cited

U.S. PATENT DOCUMENTS

| | | | |
|---|---|---|---|
| 1,877,502 | 9/1932 | Flocco | 91/525 X |
| 3,343,864 | 9/1967 | Baer | 92/92 X |
| 3,601,442 | 8/1971 | Orndorff, Jr. | 92/92 X |
| 3,924,519 | 12/1975 | England | 92/92 |
| 4,502,280 | 3/1985 | McCoy | 92/48 X |
| 4,784,042 | 11/1988 | Paynter | 92/48 X |
| 4,976,191 | 12/1990 | Suzumori et al. | 92/48 |
| 5,067,390 | 11/1991 | Negishi | 92/48 |
| 5,079,999 | 1/1992 | Negishi et al. | 92/48 |
| 5,080,000 | 1/1992 | Bubic | 92/48 X |
| 5,083,498 | 1/1992 | Sato et al. | 92/92 |

Primary Examiner—Edward K. Look
Assistant Examiner—John Ryznic
Attorney, Agent, or Firm—Foley & Lardner

[57] ABSTRACT

An actuator comprises a plurality of flexible cylinders arranged adjacent to one another. The inside of each of the flexible cylinder is divided into a plurality of pressure chambers with partition walls that extend axially inside the flexible cylinder. The actuator has a pressure adjuster for adjusting pressures in the respective pressure chambers of the flexible cylinders so that the flexible cylinders may operate at individual degrees of freedom in achieving cooperative motions.

22 Claims, 18 Drawing Sheets

⬚ : RELATIVELY LARGE PRESSURE

⬚ : RELATIVELY SMALL PRESSURE

⊠ : PRESSURIZED SECTION

PRESSURE OF $C_1$

PRESSURE OF $C_2$

PRESSURE OF $C_3$ $C_1 > C_2 > C_3$

☒ : PRESSURIZED SECTION

☒ : PRESSURIZED SECTION

▨ RELATIVELY LARGE PRESSURE

▧ RELATIVELY SMALL PRESSURE

ACTUATOR WITH FLEXIBLE CYLINDERS

This application is a continuation, of application Ser. No. 07/945,267, filed Sep. 15, 1992, now abandoned, which is a continuation, of application Ser. No. 07/631,812, filed Dec. 20, 1990, U.S. Pat. No. 5,156,081.

BACKGROUND OF THE INVENTION

1. Field of the Invention

The present invention relates to an actuator employing flexible cylinders that elastically deform in response to applied fluid pressures, and particularly to an actuator that can easily handle a soft or fragile object or an object having many curved faces.

2. Description of the Prior Art

Robots are widely used in recent years, and there are requirements to develop a robot hand that can easily handle a soft thing such as a fruit and a small animal, a fragile thing such as a glass cup, or a thing having many curved faces such as a ball and a cone. It is also required to transfer an object by fingertips of the robot hand.

Most of conventional robot hands have two fingers, and therefore, are incapable of handling an object which is soft, or fragile, or provided with many curved faces. It is also difficult for the conventional robot hands to transfer an object because it needs a very complicated control algorithm.

Multifinger robot hands now under study involve complicated mechanisms and control algorithms to hardly meet the above requirements.

In this way, the conventional robot hands involve complicated control algorithms and cannot sufficiently handle soft or fragile objects.

SUMMARY OF THE INVENTION

An object of the present invention is to provide an actuator that can easily hold an object that is soft, fragile, or provided with many curved faces, and effectively handle the object.

In order to accomplish the object, an apparatus according to the present invention comprises a plurality of flexible cylinders arranged adjacent to one another. The inside of each of the flexible cylinder is divided into a plurality of pressure chambers with partition walls that extend axially inside the flexible cylinder. The actuator has pressure adjusting means for adjusting pressures in the respective pressure chambers of the flexible cylinders so that the flexible cylinders may operate at individual degrees of freedom in achieving cooperative motions.

According to one aspect of the present invention, at least a peripheral wall of each of the flexible cylinders has anisotropic elasticity so that, by adjusting pressures in the respective pressure chambers, the flexible cylinders may separately act. Base portions of the flexible cylinders are fixed to a common base. Since the peripheral walls of the flexible cylinders have anisotropic elasticity, the flexible cylinders elastically deform when the pressure chambers are filled with pressurized fluids. Namely, the flexible cylinders axially extend or contract (with turning motions around their respective axial centers, if the anisotropic elasticity allows), or curve in optional directions. The flexible cylinders cooperatively move to hold and handle an object.

These and other objects, features and advantages of the present invention will be more apparent from the following detailed description of preferred embodiments in conjunction with the accompanying drawings.

BRIEF DESCRIPTION OF THE DRAWINGS

FIG. 3 is a sectional view taken along a line III—III of FIG. 2a;

DETAILED DESCRIPTION OF THE EMBODIMENTS

Figure 1:
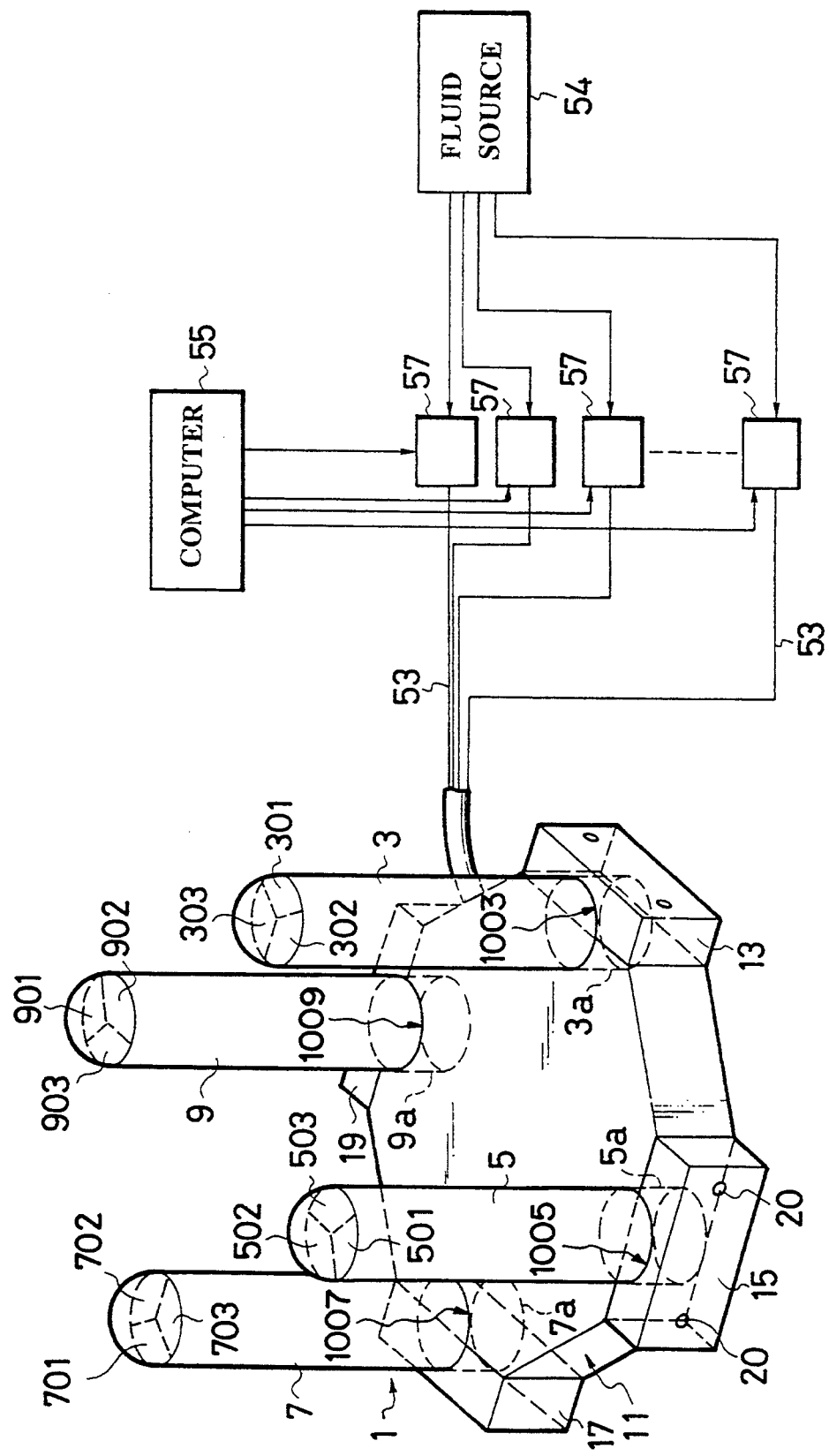
FIG. 1 is a general view showing an actuator according to a first embodiment of the present invention.
Figure 2A:
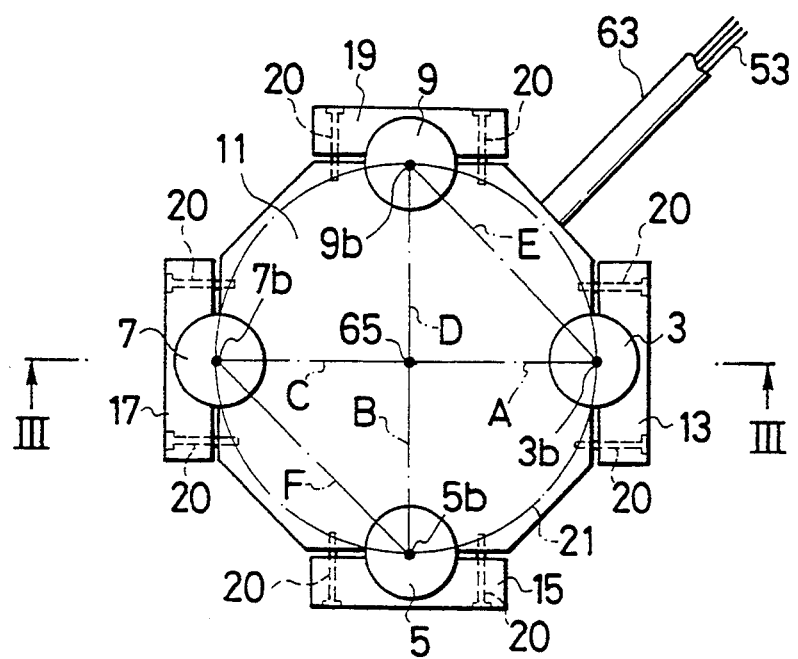
FIGS. 2a and 2b are plan views showing the actuator of FIG. 1.
Figure 2B:
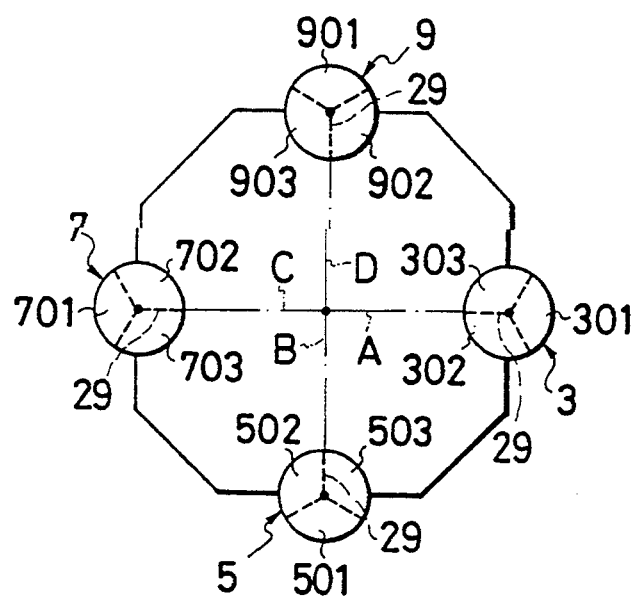
Figure 3:
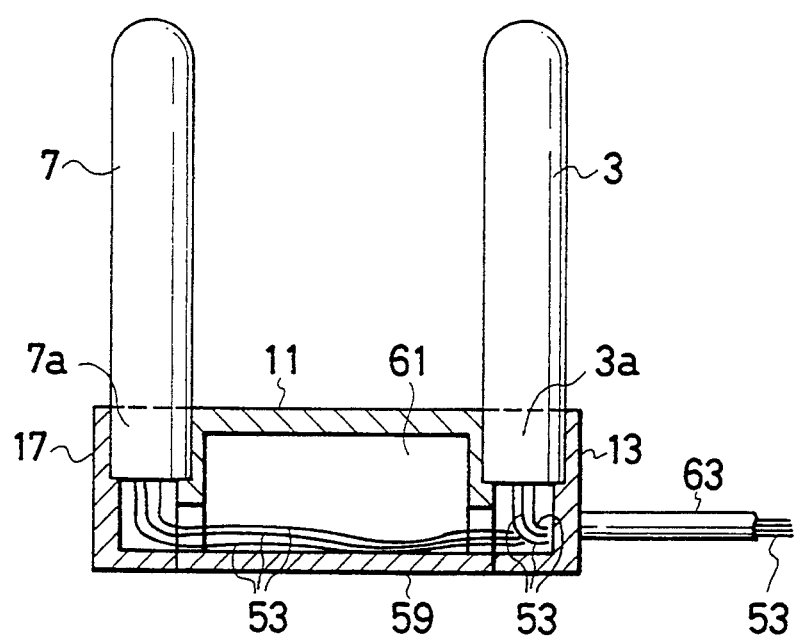

FIGS. 1 to 3 are views showing an actuator according to the first embodiment of the present invention, in which FIG. 1 shows an arrangement of the actuator (a robot hand), FIGS. 2a and 2b are plan views of the actuator, and FIG. 3 is a sectional view taken along a line III—III of FIG. 2a.

In the figures, numeral 1 denotes the actuator which comprises a plurality (four in this embodiment) of flexible cylinders 3, 5, 7, and 9. Base portions 3a, 5a, 7a, and 9a of the flexible cylinders are held between a base 11 of the actuator 1 and support members 13, 15, 17, and 19, and fastened with screws 20. The base portion is mounted in a depression (1003, 1005, 1007, 1009) in at least one of the base and a respective one of the support members. The flexible cylinders are equidistantly arranged along a circle 21 on the base 11. Center axes 3b, 5b, 7b, and 9b of the flexible cylinders are in parallel with one another.

The flexible cylinders 3, 5, 7, and 9 have pressure chambers 301, 302, 303; 501, 502, 503; 701, 702, 703; and 901, 902, 903 as shown in FIG. 2b.

Figure 4:
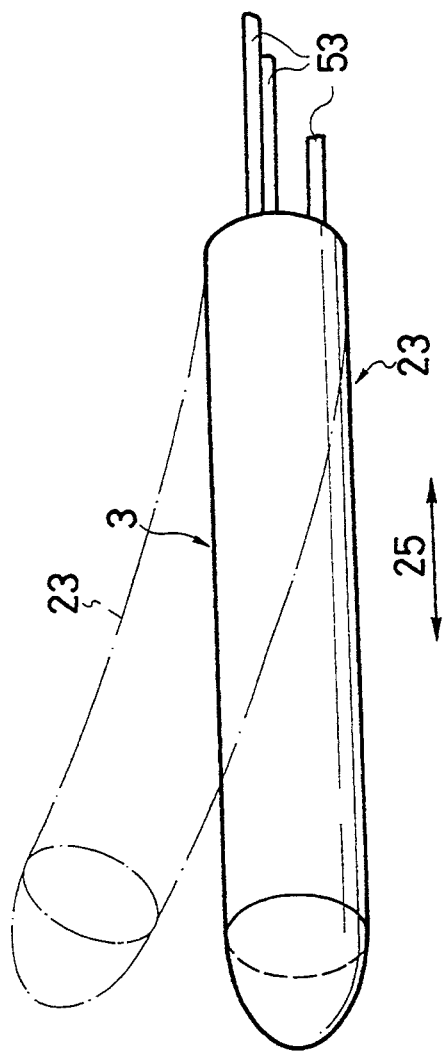
FIG. 4 is a perspective view showing the exterior of an flexible cylinder of the actuator of FIG. 1.
Figure 5:
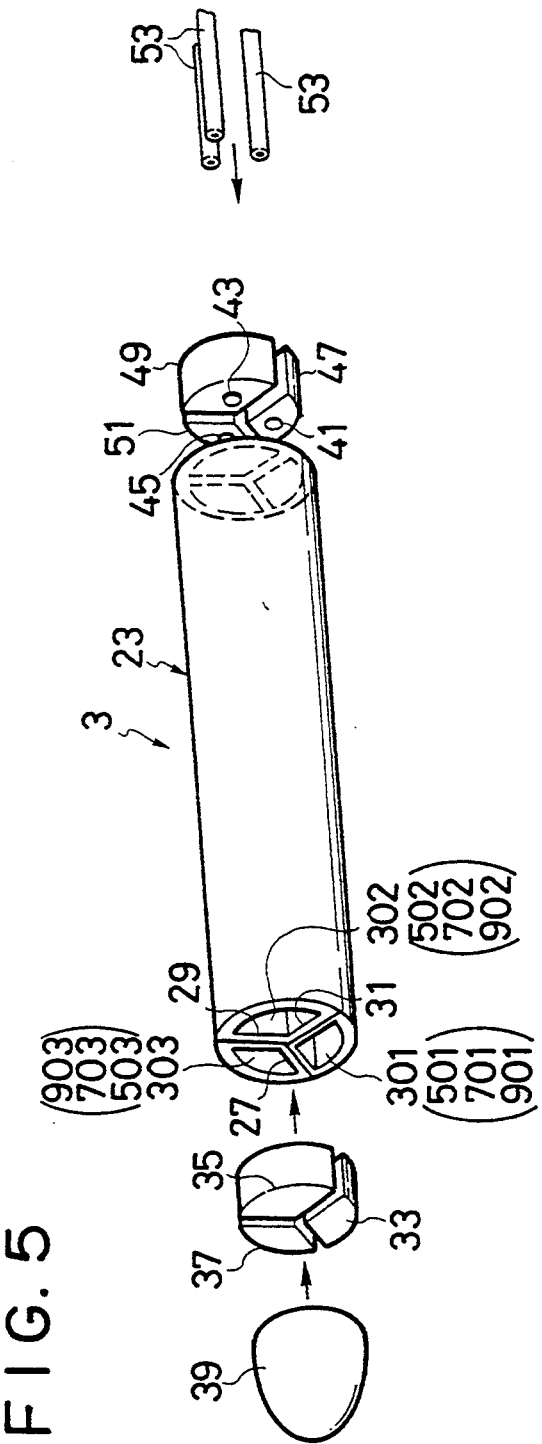
FIG. 5 is an exploded perspective view showing the flexible cylinder.

Among the flexible cylinders which are identically constituted, the flexible cylinder 3 will be explained with reference to FIGS. 4 and 5.

A peripheral wall of the flexible cylinder 3 comprises a tubular elastic body 23 having anisotropic elasticity. The tubular elastic body 23 having anisotropic elasticity. The tubular elastic body 23 is made of, for example, circumferentially wound fibers. Namely, the tubular elastic body 23 includes fiber wound around the axis spirally with fine inter-fiber spaces, and a silicone rubber coated over the fiber. By forming the tubular elastic body 23 from an anisotropic material combined of the fiber and the rubber, a direction small in modulus of longitudinal elasticity is substantially aligned with the axial direction of the tubular elastic body 23, and the tubular elastic body 23 is easily extendible in the axial direction. But in a direction perpendicular to the axial direction, the tubular elastic body 23 is hardly extendible because it is large in modulus of elasticity due to the fiber. The tubular elastic body 23 has a plurality (three in this embodiment) of elastic partition walls 27, 29, and 31 that extend along a center axis 25 of the elastic tubular body 23 to define a plurality (three in this embodiment) of pressure chambers 301, 302, and 303 inside the elastic tubular body 23.

One ends of the pressure chambers are closed with lids 33, 35, and 37. A round tip member 39 is adhered to end faces of the lids. The other ends of the pressure chambers are closed with lids 47, 49, and 51, which are made of relatively hard elastic material and have through holes 41, 43, and 45, respectively. As the material of the lids 47, 49, and 51, it is possible to employ the material same as that of the elastic tubular body 23, a metal material, or a plastic material. A portion of the elastic tubular body 23 which is provided with the lid become each of the base portions 3a-9a. The base portion has a thickness greater than the thickness of the tubular elastic body.

Tubes 53 pass through the through holes and slightly protrude into the pressure chambers 301, 302, and 303. These tubes 53 guide a fluid such as air from a fluid source 54 into the pressure chambers as shown in FIG. 1. Fluid pressures in the pressure chambers are separately adjustable with valves 57 that control flow rates of the fluid from the fluid source 54 and with a computer 55 that controls the valves 57, so that the tubular elastic body 23 may curve and deform through elastic expansion/contraction along the center axis 25, or turn around the center axis 25. As the valve 57, it is possible to employ a pressure control valve for example.

The other flexible cylinders 5, 7, and 9 have the same arrangement as that of the flexible cylinder 3. The flexible cylinder 5 has pressure chambers 501, 502, and 503, the flexible cylinder 7 has pressure chambers 701, 702, and 703, and the flexible cylinder 9 has pressure chambers 901, 902, and 903. Ends of tubes 53 protrude into these pressure chambers, and the other ends of the tubes 53 are connected to the fluid source 54 through valves 57.

The tubular elastic body 23, lids 33, 35, and 37, tip member 39, and lids 47, 49, and 51 may integrally be formed from silicone rubber, etc.

A bottom plate 59 (FIG. 3) is attached to the bottom of the base 11 of the actuator 1, thereby forming a space 61 through which the tubes 53 are guided outside. The tubes 53 are collectively protected by a protective tube 63.

The actuator 1 can carry out various operations, which will be explained one by one.

FIGS. 6a to 7b shows a first operation of the actuator 1 for holding an object M from four directions. In this operation, the flexible cylinders 3, 5, 7, and 9 are operated in planes A, B, C, and D, respectively, that are vertical to the plane of FIG. 2a and defined by a center axis 65 of the circle 21 on the base 11 and the center axes 3b, 5b, 7b, and 9b of the flexible cylinders, as shown in FIG. 2a.

Figure 6A:
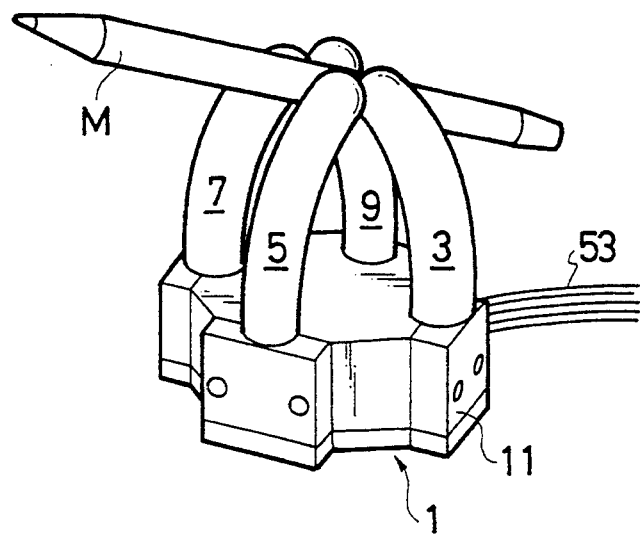
FIGS. 6a to 8b are views explaining a first operation of the actuator.
Figure 6B:
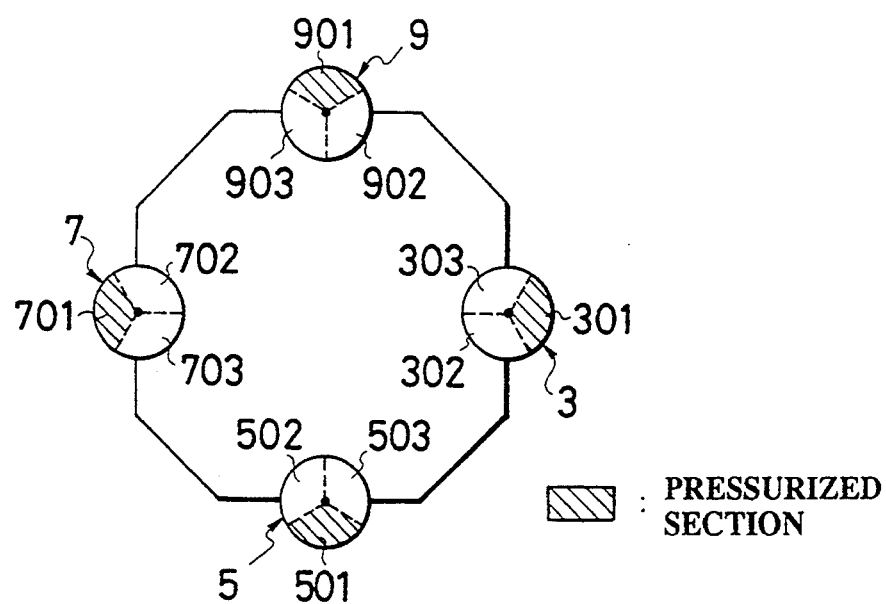
Figure 7A:
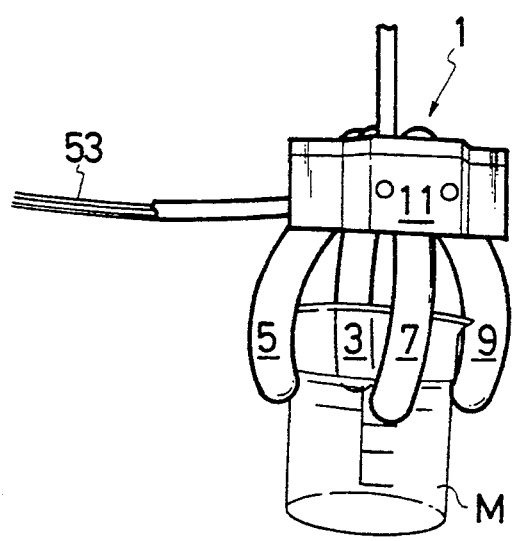
Figure 7B:
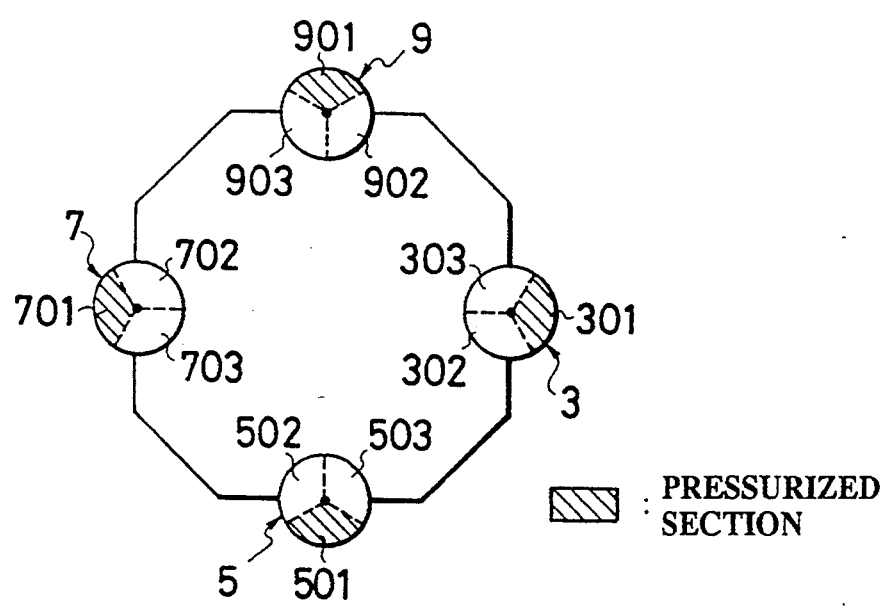

To operate the flexible cylinders 3, 5, 7, and 9 in the respective planes A, B, C, and D, the flexible cylinders are arranged such that every elastic partition wall 29 between the pressure chambers 302 and 303 (502 and 503, 702 and 703, 902 and 903) of the flexible cylinder 3 (5, 7, 9) is oriented toward the center axis 65 in the plane A (B, C, C) as shown in FIGS. 6b and 7b. A pressurized fluid is supplied only to the pressure chambers 301, 501, 701, and 901 of the flexible cylinders as indicated with hatches in FIGS. 6b and 7b. Consequently, the flexible cylinders curve inwardly in the respective planes A, B, C, and D.

Figure 8A:
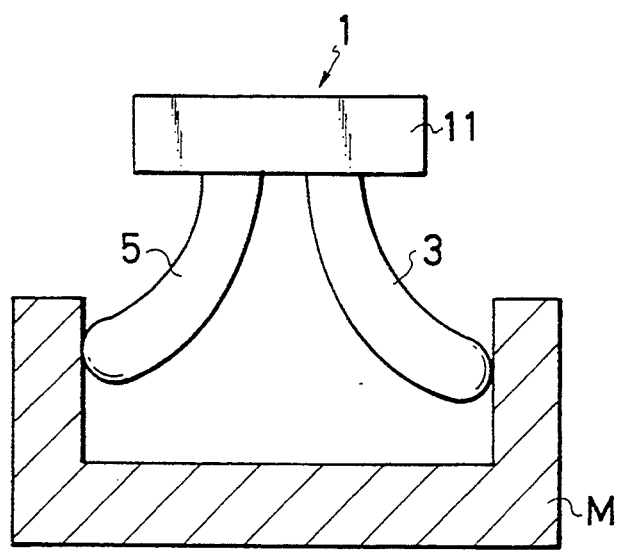
Figure 8B:
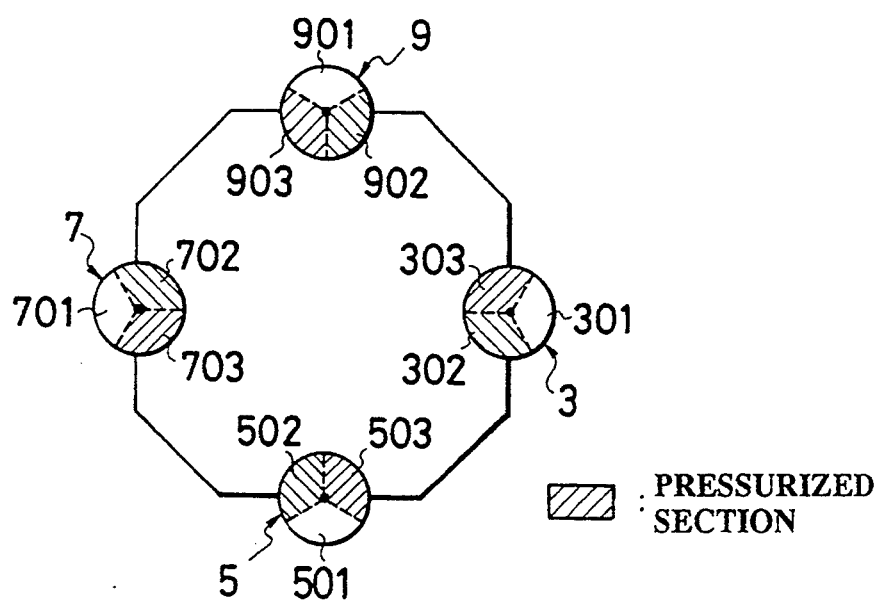

In FIGS. 8a and 8b, the fluid is equally supplied to the pressure chambers 302, 303, 502, 503, 702, 703, 902, and 903 of the flexible cylinders to curve the flexible cylinders outwardly in the respective planes A, B, C and D. In this case, an object M is held by the actuator 1 from the inside as shown in FIG. 8a.

In this way, the elastic partition walls 29 of the flexible cylinders are positioned in the respective planes A, B, C, and D to easily achieve the first operation. This embodiment does not limit, however, the orientations of the elastic partition walls 29. namely, the elastic partition walls 29 may be oriented in any directions to achieve the first operation because the flexible cylinders can curve in any direction according to applied fluid pressures.

By controlling the actuator 1 in ways mentioned above, it can hold the object M as shown in FIGS. 6a to 8b. Even if the object is made of glass and has a complicated shape as shown in FIG. 7a, the actuator 1 can curve the flexible cylinders 3, 5, 7, and 9 according to the shape of the object to softly handle the object. The flexible cylinders can curve outwardly as shown in FIG. 8a to hold the object from the inside. The actuator 1 can vertically and horizontally move or turn the holding object only through the movements of the flexible cylinders without moving an arm (not shown) to which the actuator 1 is attached. This is achieved by separately adjusting fluid pressure supplied to the flexible cylinders, 3, 5, 7, and 9.

A second operation of the actuator 1 will be explained.

Figure 9A:
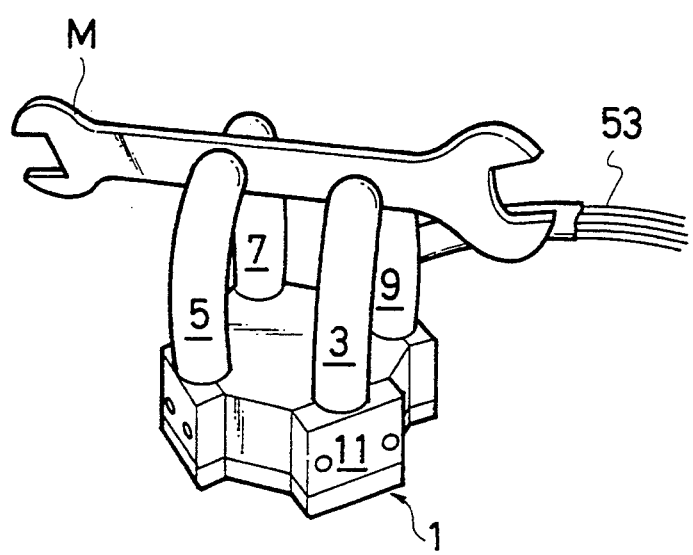
FIGS. 9a to 9c are views explaining a second operation of the actuator.

In this operation, the actuator 1 holds an object M from the front and rear sides or the left and right sides of the object as shown in FIG. 9a. The actuator 1 is arranged in the same manner as in FIG. 6a, and the flexible cylinders 3, 5, 7, and 9 are operated in planes E and F, which are vertical to the plane of FIG. 2a and defined by the center axes 3b and 9b of the flexible cylinders 3 and 9 and the center axes 5b and 7b of the flexible cylinders 5 and 7.

Figure 9B:
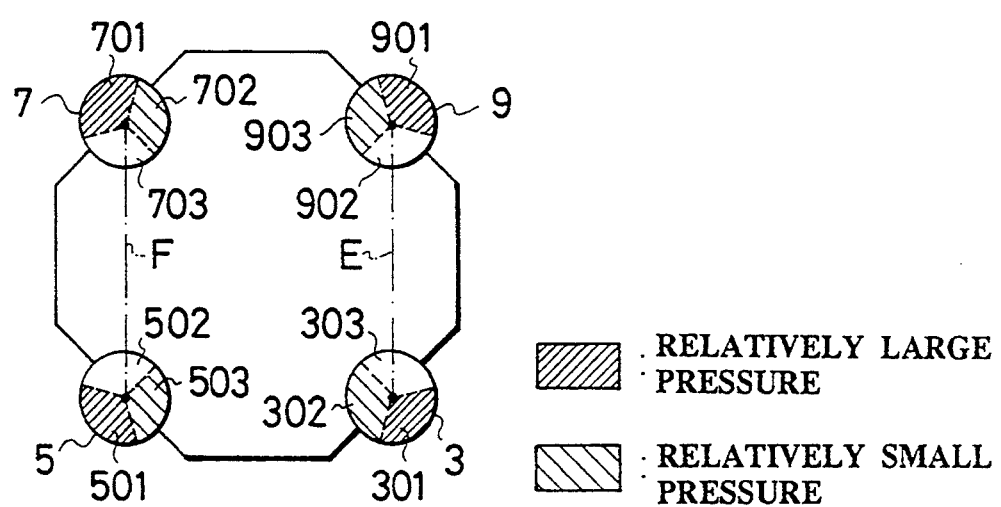

In FIG. 9b, the pressure chambers 301, 501, 701, and 901 are filled with a fluid of high pressure, the pressure chambers 302, 503, 702, and 903 with a fluid of low pressure, and the pressure chambers 303, 502, 703, and 902 with no fluid. As a result, the flexible cylinders 3, 5, 7, and 9 curve inwardly in the planes E and F.

Similar to the first operation, the second operation does not limit the orientations of the elastic partition walls 29 of the respective flexible cylinders.

Figure 9C:
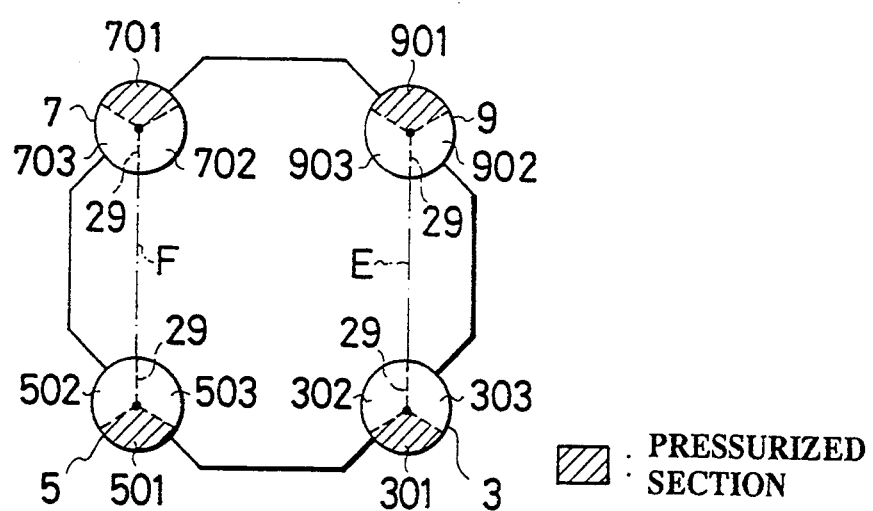

For example, the elastic partition walls 29 may be positioned in the planes E and F as shown in FIG. 9c. Namely, the elastic partition wall 29 between the pressure chambers 302 and 303 of the flexible cylinder 3 and that between the pressure chambers 902 and 903 of the flexible cylinder 9 are oriented inwardly in the plane E, which the elastic partition wall 29 between the pressure chambers 502 and 503 of the flexible cylinder 5 and that between the pressure chambers 702 and 703 of the flexible cylinder 7 are inwardly oriented in the plane F.

When a pressurized fluid is supplied only to the pressure chambers 301, 501, 701, and 901 of the flexible cylinders in FIG. 9c, the flexible cylinders 3 and 9 curve inwardly in the plane E and the flexible cylinders 5 and 7 inwardly in the plane F. On the other hand, when the fluid is equally supplied to the pressure chambers 302, 303, 502, 503, 702, 703, 902, and 903 of the flexible cylinders, the flexible cylinders 3 and 9 curve outwardly in the plane E and the flexible cylinders 5 and 7 outwardly in the plane F.

The flexible cylinders 3 and 9 may be separated far from the flexible cylinders 5 and 7 to stably hold a long object.

A transferring operation of the actuator 1 will be explained with reference to FIGS. 10 to 13b. In this operation, the actuator 1 holds and moves an object M.

Figure 10:
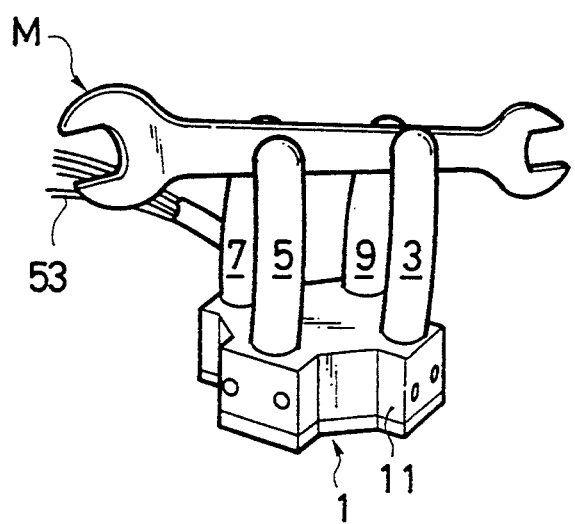
FIGS. 10 to 13b are views explaining motions of the actuator in handling an object M.

In FIG. 10, the actuator 1 has the same arrangement as that of FIG. 9a. The flexible cylinders 3, 5, 7, and 9 of the actuator 1 hold an object M from the front and rear sides or the left and right sides of the object. Under this state (FIG. 9c), the fluid is equally supplied further to the pressure chambers 301, 302, and 303 of the flexible cylinder 3, the pressure chambers 501, 502, and 503 of the flexible cylinder 5, the pressure chambers 701, 702, and 703 of the flexible cylinder 7, and the pressure chambers 901, 902, and 903 of the flexible cylinder 9. As a result, the flexible cylinders expand along the respective center axes 3b, 5b, 7b, and 9b as shown in FIG. 11b to lift the object M as shown in FIG. 11a.

Figure 11A:
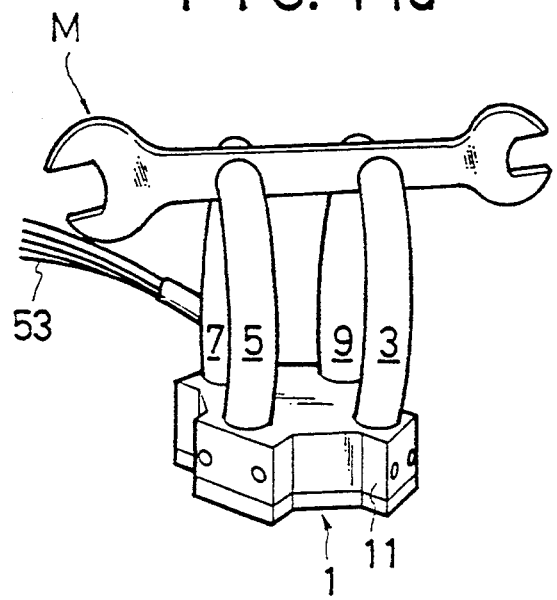
Figure 11B:
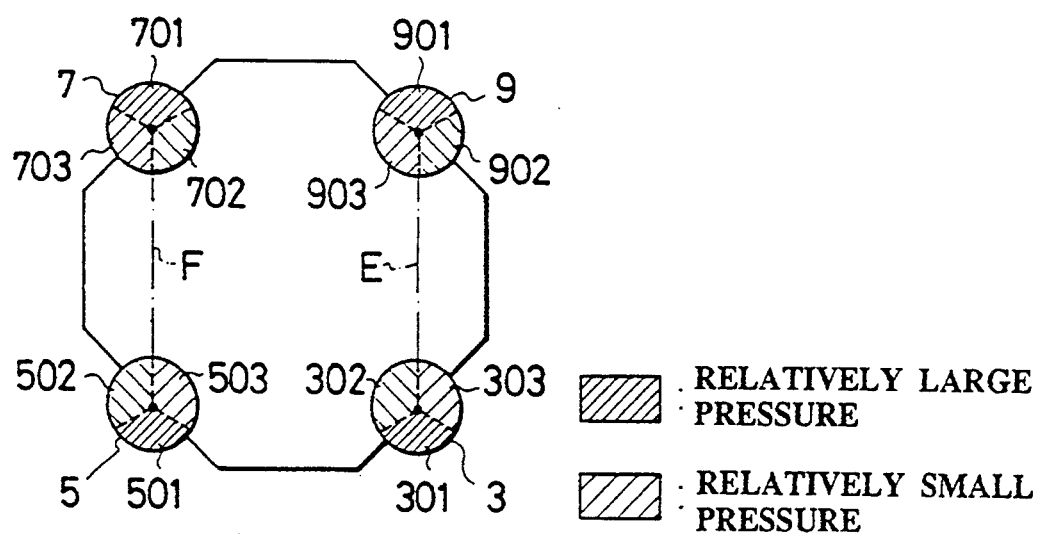
Figure 12A:
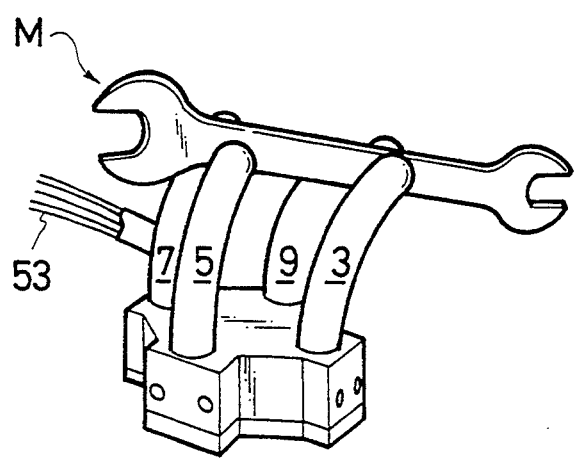
Figure 12B:
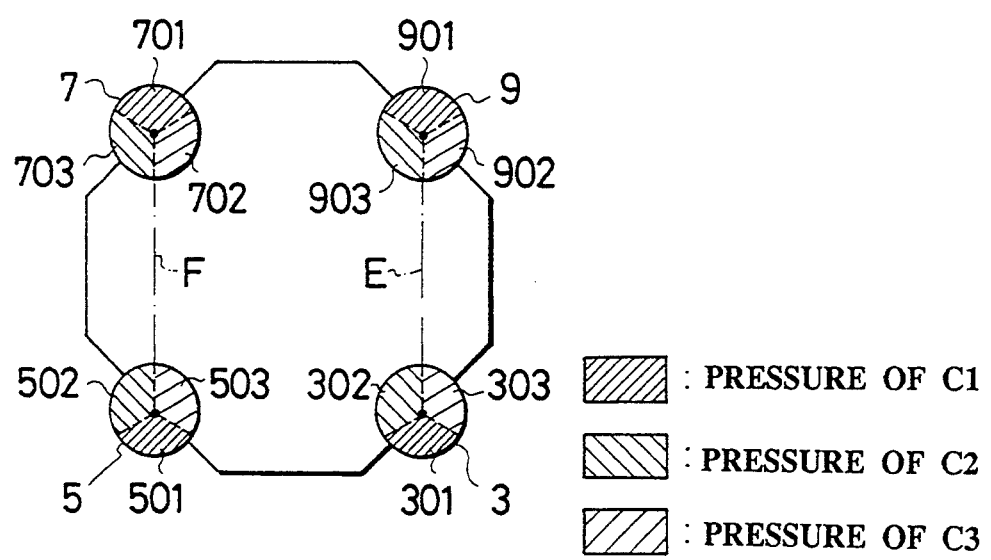

From the state of FIG. 11a, the fluid may be supplied to the pressure chambers 301 and 302 of the flexible cylinder 3, the pressure chambers 501 and 502 of the flexible cylinder 5, the pressure chambers 701 and 703 of the flexible cylinder 7, and the pressure chambers 901 and 903 of the flexible cylinder 9 as shown in FIG. 12b, thereby curving the flexible cylinders rightward and moving the object M rightward as shown in FIG. 12a.

Figure 13A:
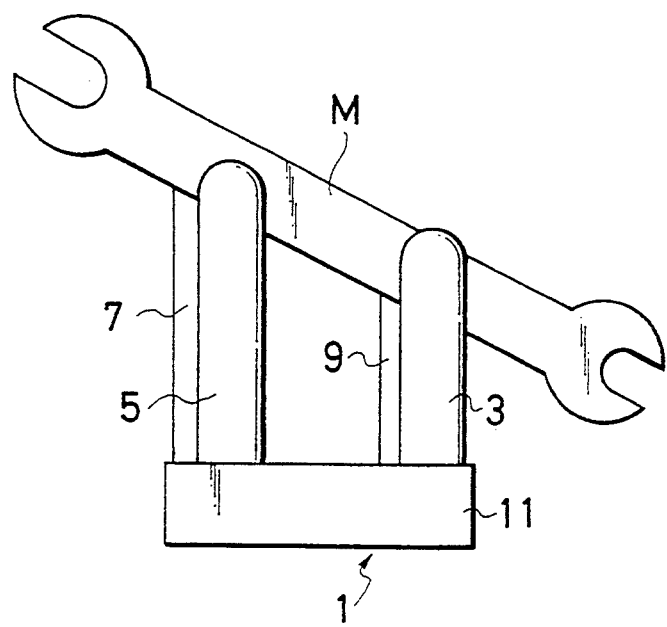
Figure 13B:
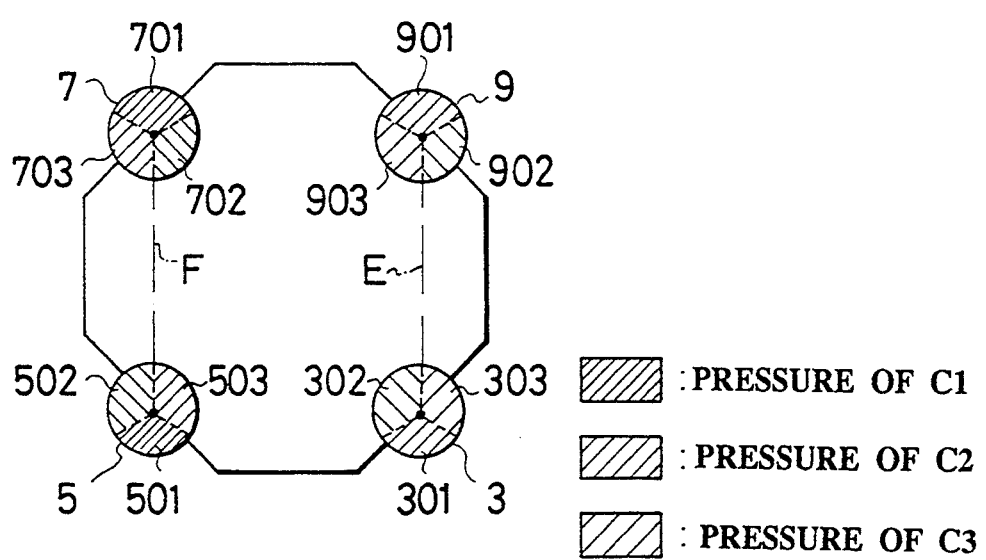

Also, the fluid may be supplied in a way to expand the flexible cylinders 5 and 7 while contracting or maintaining the flexible cylinders 3 and 9 as they are as shown in FIG. 13b, thereby inclining the object M as shown in FIG. 13a.

Figure 14:
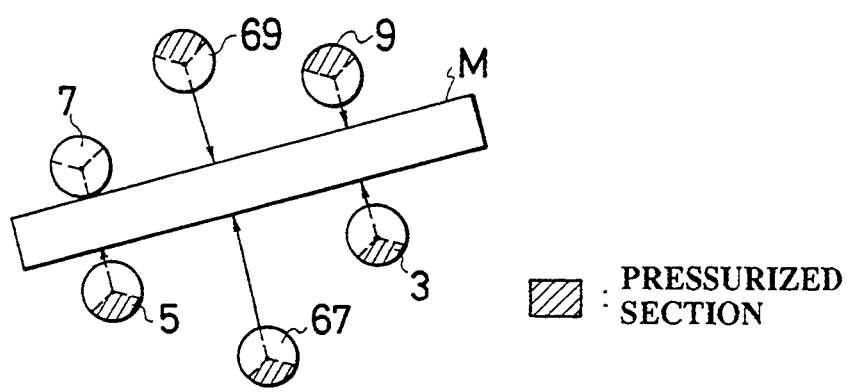
FIGS. 14 and 15 are views showing modifications of the first embodiment, having many flexible cylinders.
Figure 15:
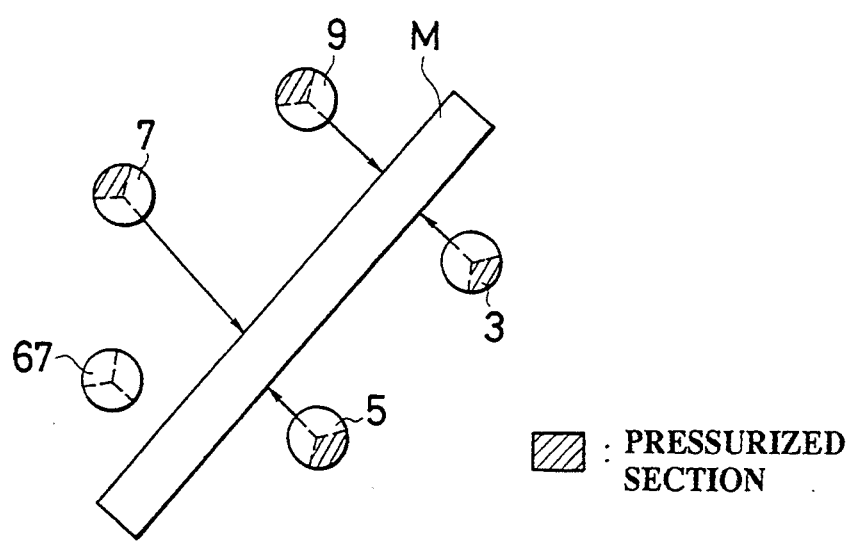

FIGS. 14 and 15 are views showing modifications of the second operation. In each case, an actuator 1 is provided with many flexible cylinders.

In FIG. 14, the actuator 1 has six flexible cylinders 3, 5, 7, 9, 67, and 69, which are pressurized as shown in the figure to hold an object M between the cylinders 3, 5, and 67 and the cylinders 7, 9, and 69.

In FIG. 15, the actuator 1 has five flexible cylinders 3, 5, 7, 9, and 67, among which the cylinders 3, 5, 7, and 9 are operated to hold an object M.

A third operation of the actuator 1 will be explained.

Figure 16:
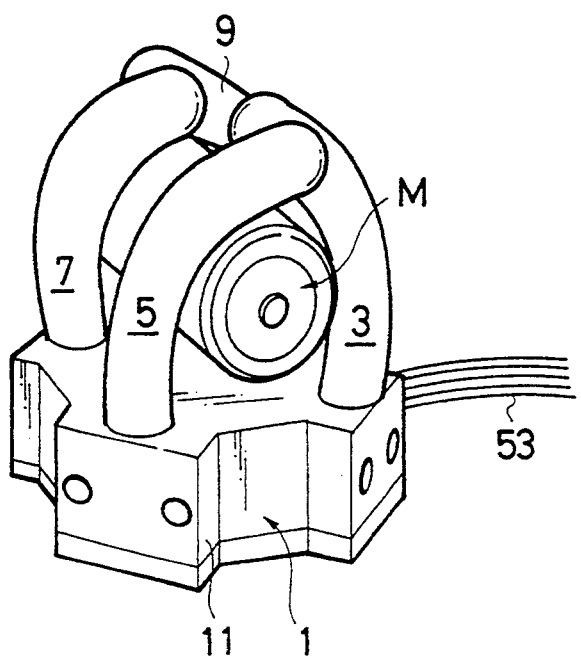
FIGS. 16 and 17 are views explaining a third operation of the actuator of the first embodiment.

In FIG. 16, an object M is pushed against the base portions of the flexible cylinders 3, 5, 7, and 9 or against the base 11 of the actuator 1 from the front and rear sides or the left and right sides of the object M.

Figure 17:
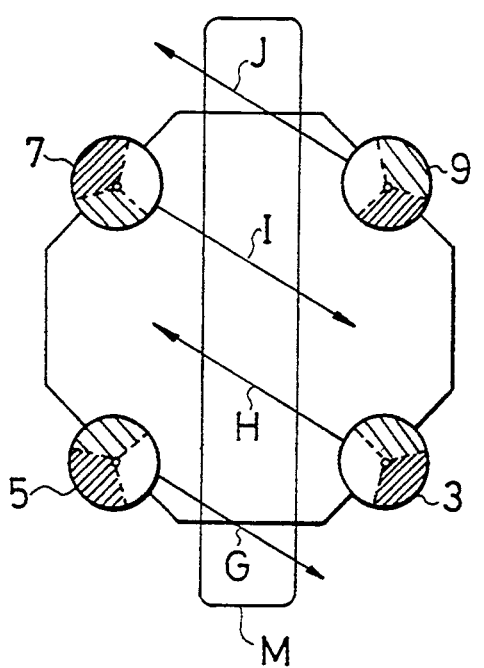

As shown in FIG. 17, a pressurized fluid is supplied to the flexible cylinders 3, 5, 7, and 9 to curve them inwardly in planes G, H, I, and J, respectively, in a way to avoid their interference. The planes G, H, I, and J are orthogonal to the plane of FIG. 17. As a result, the object M is pushed against the base portions of the flexible cylinders or against the base 11 of the actuator 1.

Figure 18A:
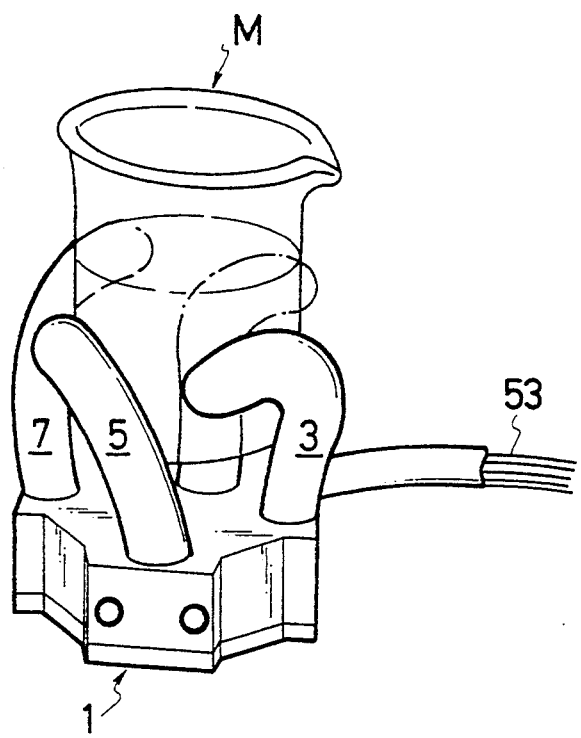
FIGS. 18a and 18b are views explaining another operation involving a turning motion, of the first embodiment.
Figure 18B:
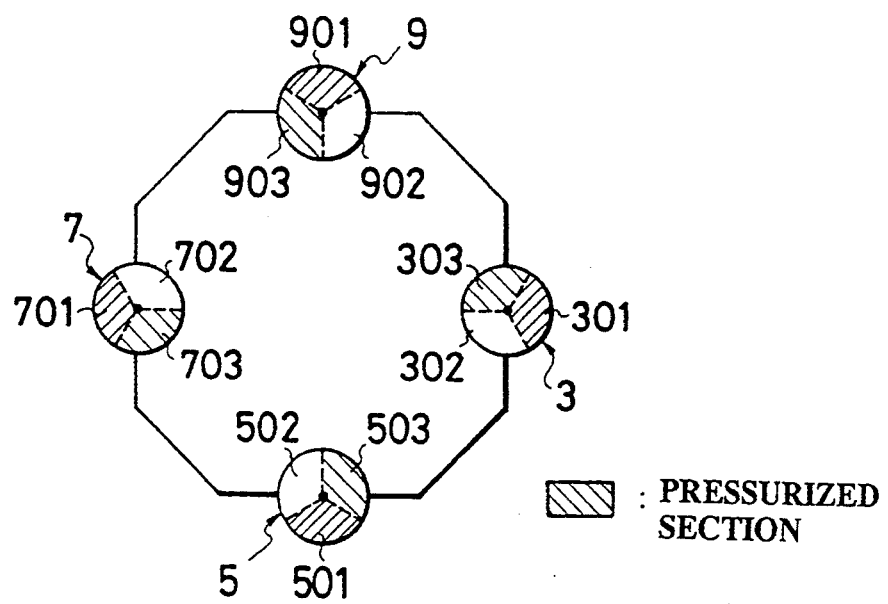

The flexible cylinders of the actuator 1 may be pressurized as shown in FIG. 18b to horizontally bend the cylinders, thereby turning the holding object M.

FIGS. 19 to 22 show the second, thirds, and fourth embodiments of the present invention.

Figure 19:
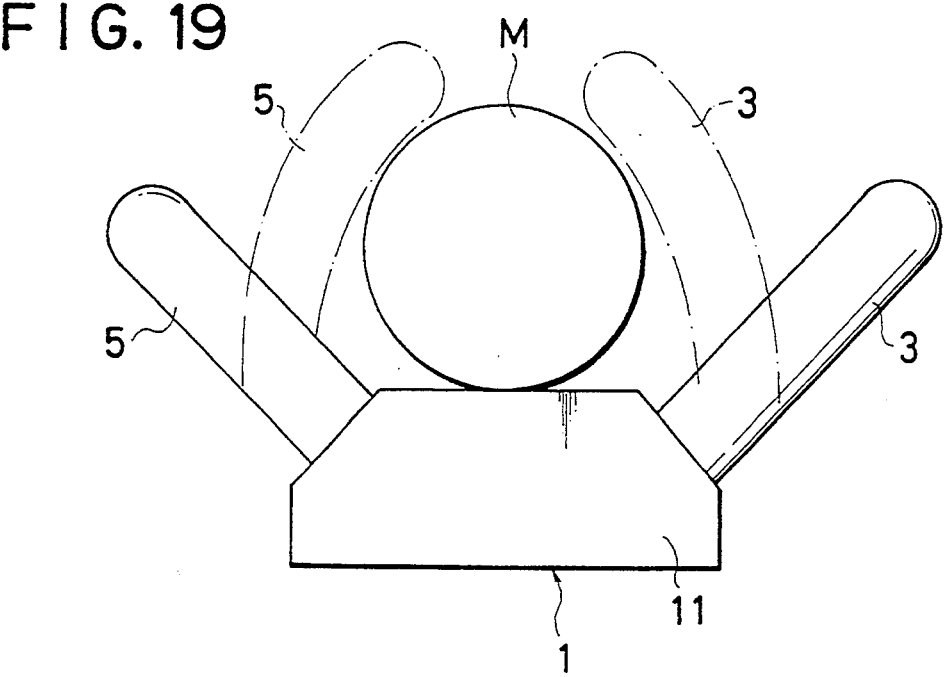
FIGS. 19 to 22 are views showing second, third, and fourth embodiments of the present invention.

In FIG. 19, center axes 3b and 5b of flexible cylinders 3 and 5 are inclined outwardly on a base 11 of an actuator 1. This arrangement allows the flexible cylinders 3 and 5 to have wide working ranges, a floating thing to be effectively protected, and its own robot arm to be guided to a holding object M.

Figure 20:
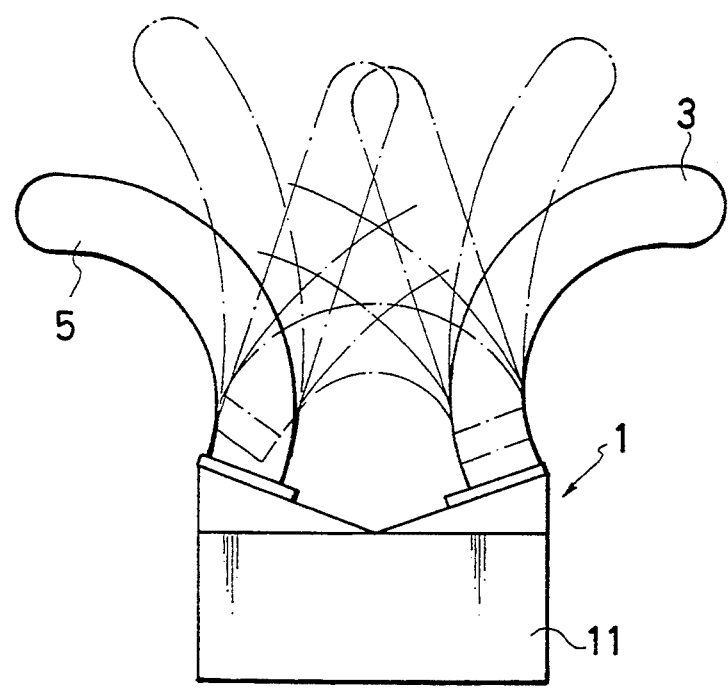

In FIG. 20, center axes 3b and 5b of flexible cylinders 3 and 5 are inwardly inclined on a base 11 of an actuator 1. With this arrangement, top ends of the flexible cylinders 3 and 5 deeply bend toward a center axis 65 of the base 11, i.e., a center axis of a robot hand, so that an object M may stably be held in the third operation explained with reference to FIG. 16.

Figure 21:
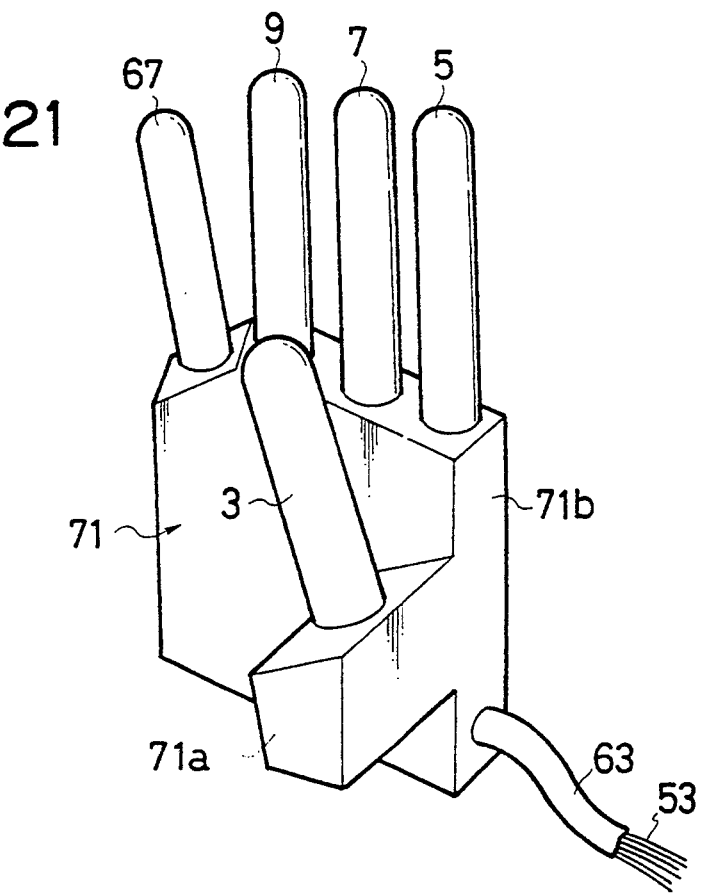
Figure 22:
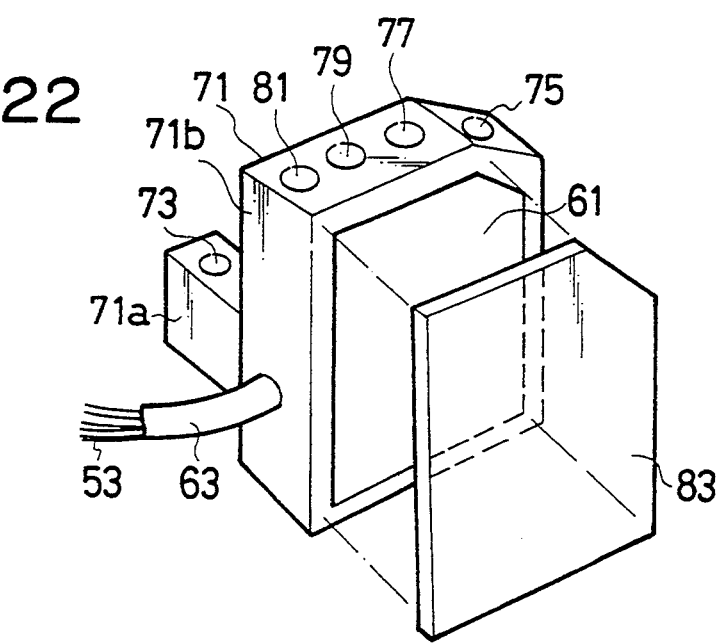

In FIGS. 21 and 22, five flexible cylinders 3, 5, 7, 9, and 67 are arranged like a human hand. A base 71 comprises a base portion 71a having a fitting hole 73 for receiving the flexible cylinder 3 corresponding to a thumb, and a base portion 71b having fitting holes 75, 77, 79, and 81 for receiving the flexible cylinders 5, 7, 9, and 67 corresponding to the remaining four fingers of the hand. The flexible cylinders 3, 5, 7, 9, and 67 are inserted to the fitting holes 73, 75, 77, 79, and 81, respectively, and adhered thereto. Tubes 53 of the flexible cylinders are passed through a space 61 inside the base portion 71b, and collectively protected by a protective tube 63 on the outside of the space 61. A back plate 83 closes the space 61. This actuator 1 is controlled to operate like a human hand.

Figure 23:
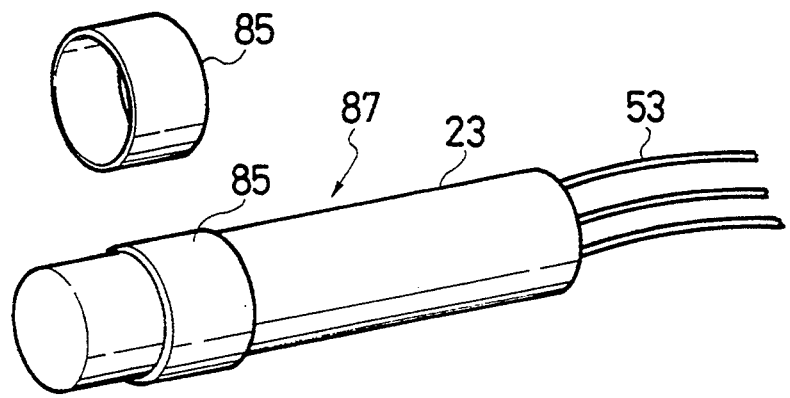
FIGS. 23 to 25 are views showing modifications of the flexible cylinder.
Figure 24:
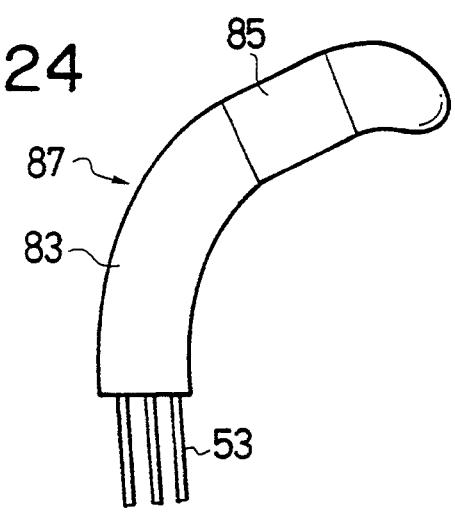
Figure 25:
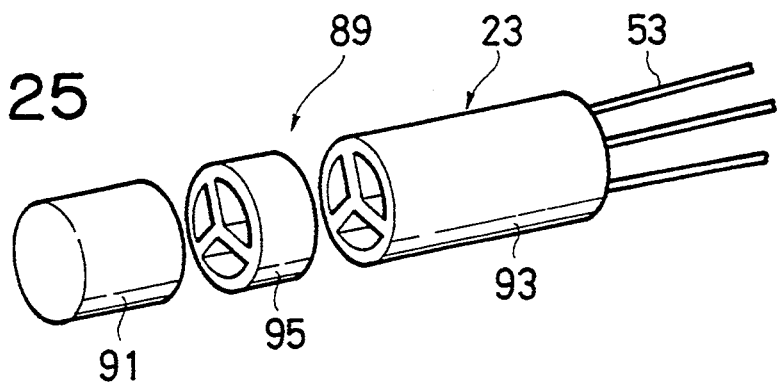

FIGS. 23 to 25 show modifications of the flexible cylinder.

In FIG. 23, a tubular elastic body 23 is partly covered with a thin ring 85, which is made of metal or plastics so that it may not easily deform. The thin ring 85 is adhered to a predetermined position on the tubular elastic body 23 to form a flexible cylinder 87. When a pressurized fluid is supplied to the flexible cylinder 87, the thin ring 85 does not deform so that the flexible cylinder 87 may irregularly curve as shown in FIG. 24. The number, length, and fitting position of the thin rings 85 are optional so that any curve suitable for an object may be realized by the flexible cylinder 87.

In FIG. 25, part of an elastic tubular body 23 is formed of different material that does not easily deform. Namely, the elastic tubular body 23 of a flexible cylinder 89 comprises parts 91 and 93 formed of anisotropic material, and a part 95 formed of material that does not easily deform compared with the material of the parts 91 and 93. These parts are separately formed, and fixedly connected to one another with adhesives, etc. This arrangement may provide nearly the same effect as that of FIG. 23.

In the above embodiments, the peripheral wall of the elastic tubular body of the flexible cylinder may be reinforced to form a smaller angle than an angle of parallelism (at which the elastic tubular body does not radially expand or contract) with respect to a generating line of the flexible cylinder that is in parallel with the center axis of the flexible cylinder by winding the fiber at the smaller angle than the angle of parallelism, so that the flexible cylinder may contract axially with or without turning around the center axis when the fluid is supplied to the pressure chambers of the flexible cylinder.

The present invention is applicable not only for a robot hand but also for a transporting apparatus for transporting an object in a plane by a number of closely arranged actuators.

In summary, an actuator of the present invention has a plurality of flexible cylinders fixed to a common base. The peripheral wall of each flexible cylinder has anisotropic elasticity so that the flexible cylinder may elastically deform, or curve while turning around an axial center thereof when pressurized fluids are supplied to pressure chambers of the flexible cylinder. As a result, the actuator can easily handle a soft or fragile object, or an object having many curved faces. The flexible cylinders of the actuator can tilt or move to realize a transferring motion.

Various modifications will become possible for those skilled in the art after receiving the teachings of the present disclosure without departing from the scope thereof.

What is claimed is:

1. An actuator comprising:
   a base to which support members are fastened; and
   at least two flexible cylinders, each comprising:
      a tubular elastic body having anisotropic elasticity;
      an elastic partition wall dividing the tubular elastic body into a plurality of individual pressure chambers; and
      a base portion made of elastic material, the base portion having a thickness greater than the thickness of the tubular elastic body, the base portion designating an end of the flexible cylinder, the base portion being held by and between the base and one of the support members, the flexible cylinders being thereby supported in a predetermined positional relationship.

2. The actuator of claim 1, further comprising:
   pressure adjusting means for separately adjusting the pressure in each of the pressure chambers of each of the flexible cylinders
   wherein the base portion is mounted in a depression in at least one of the base and a respective one of the support members, and wherein the base portion is adhesively-free held fast by and between the base and the respective support member.

3. The actuator of claim 2, wherein the pressure adjusting means comprises:
   a fluid source for supplying a fluid;
   valves for adjusting a pressure of the fluid supplied by the fluid source, the pressure adjusted fluid being supplied to a predetermined pressure chamber of the flexible cylinders; and
   control means for controlling the valves.

4. The actuator of claim 1, wherein the flexible cylinders are arranged such that center axes thereof are parallel to each other.

5. The actuator of claim 1, wherein the flexible cylinders are arranged equidistantly along a circle on the base.

6. The actuator of claim 1, wherein the flexible cylinders are arranged such that the partition wall of each flexible cylinder is oriented toward a common axis perpendicular to a plane of the base.

7. The actuator of claim 1, wherein the flexible cylinders are arranged such that at least one partition wall of a first flexible cylinder is positioned in a plane common to at least one partition wall of a second flexible cylinder adjacent said first flexible cylinder.

8. The actuator of claim 7, wherein the flexible cylinders are arranged such that at least one partition wall of a third flexible cylinder is positioned in another plane common to at least one partition wall of a fourth flexible cylinder adjacent said third flexible cylinder, and wherein said plane and said another plane are parallel to each other.

9. The actuator of claim 1, wherein center axes of the flexible cylinders are inclined outwardly on the base.

10. The actuator of claim 1, wherein center axes of the flexible cylinders are inclined inwardly on the base.

11. The actuator of claim 1, wherein the flexible cylinders are arranged like fingers of a human hand.

12. The actuator of claim 1, wherein each one end of the pressure chambers is closed with a respective closing member to which a round tip member is attached.

13. An actuator comprising:
   a base to which support members are fastened;
   at least two flexible cylinders, each comprising:
      a tubular elastic body having anisotropic elasticity;
      an elastic partition wall dividing the tubular elastic body into a plurality of individual pressure chambers; and
      a base portion made of elastic material, the base portion having a thickness greater than the thickness of the tubular elastic body, the base portion designating an end of the flexible cylinder, the base portion being held by and between the base and one of the support members, the flexible cylinders being thereby supported in a predetermined positional relationship; and
   pressure adjusting means for separately adjusting the pressure in each of the pressure chambers of each of the flexible cylinders, the pressure adjusting means comprising:
      a fluid source for supplying a fluid;
      valves for adjusting a pressure of the fluid supplied by the fluid source, the pressure adjusted fluid being supplied to a predetermined pressure chamber of the flexible cylinders; and
      control means for controlling the valves.

14. The actuator of claim 13, wherein the flexible cylinders are arranged such that center axes thereof are parallel to each other
   wherein the base portion is mounted in a depression in at least one of the base and a respective one of the support members, and wherein the base portion is adhesively-free held fast by and between the base and the respective support member.

15. The actuator of claim 13, wherein the flexible cylinders are arranged equidistantly along a circle on the base.

16. The actuator of claim 13, wherein the flexible cylinders are arranged such that the partition wall of each flexible cylinder is oriented toward a common axis perpendicular to a plane of the base.

17. The actuator of claim 13, wherein the flexible cylinders are arranged such that at least one partition wall of a first flexible cylinder is positioned in a plane common to at least one partition wall of a second flexible cylinder adjacent said first flexible cylinder.

18. The actuator of claim 17, wherein the flexible cylinders are arranged such that at least one partition wall of a third flexible cylinder is positioned in another plane common to at least one partition wall of a fourth flexible cylinder adjacent said third flexible cylinder, and wherein said plane and said another plane are parallel to each other.

19. The actuator of claim 13, wherein center axes of the flexible cylinders are inclined outwardly on the base.

20. The actuator of claim 13, wherein center axes of the flexible cylinders are inclined inwardly on the base.

21. The actuator of claim 13, wherein the flexible cylinders are arranged like fingers of a human hand.

22. The actuator of claim 13, wherein each one end of the pressure chambers is closed with a respective closing member to which a round tip member is attached.

* * * * *